US012215646B1

(12) United States Patent
Katayama et al.

(10) Patent No.: US 12,215,646 B1
(45) Date of Patent: Feb. 4, 2025

(54) ABNORMALITY DIAGNOSIS DEVICE FOR INTERNAL COMBUSTION ENGINE

(71) Applicant: TOYOTA JIDOSHA KABUSHIKI KAISHA, Toyota (JP)

(72) Inventors: Akihiro Katayama, Toyota (JP); Yoshifumi Matsuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/756,038

(22) Filed: Jun. 27, 2024

(30) Foreign Application Priority Data

Oct. 16, 2023 (JP) ................................ 2023-178316

(51) Int. Cl.
*F02D 41/22* (2006.01)

(52) U.S. Cl.
CPC ...... *F02D 41/222* (2013.01); *F02D 2041/223* (2013.01)

(58) Field of Classification Search
CPC ........................... F02D 41/222; F02D 2250/08
See application file for complete search history.

(56) References Cited

U.S. PATENT DOCUMENTS

2020/0362787 A1 11/2020 Tsuji et al.

FOREIGN PATENT DOCUMENTS

JP 2020-186702 A 11/2020

*Primary Examiner* — Ngoc T Nguyen
(74) *Attorney, Agent, or Firm* — SoraIP, Inc.

(57) ABSTRACT

A setting unit which is connected to an intake passage and defines a reference value for a pressure in a passage through which gas flows, an accumulating unit which integrates a difference between the reference value and the pressure from a point in time when the pressure falls below the reference value and acquires an cumulative value, and a diagnosis unit which diagnoses an abnormality of the passage based on the cumulative value, wherein when there is no peak in the pressure, the setting unit sets the reference value based on a state of the internal combustion engine, and when there is a peak in the pressure, the setting unit sets the peak as the reference value in the abnormality diagnosis device.

5 Claims, 6 Drawing Sheets

ABNORMALITY DIAGNOSIS DEVICE FOR INTERNAL COMBUSTION ENGINE

CROSS-REFERENCE TO RELATED APPLICATION

This application claims priority to Japanese Patent Application No. 2023-178316 filed on Oct. 16, 2023, incorporated herein by reference in its entirety.

BACKGROUND

1. Technical Field

The disclosure relates to an abnormality diagnosis device for an internal combustion engine.

2. Description of Related Art

Blowby gas may leak from a combustion chamber of an internal combustion engine to a crankcase. The blowby gas flows through a blowby gas passage and is recirculated to an intake passage. Technology for detecting an abnormality in the blowby gas passage, based on pressure in the blowby gas passage, has been developed (e.g., Japanese Unexamined Patent Application Publication No. 2020-186702 (JP 2020-186702 A) or the like).

SUMMARY

However, accuracy of diagnosis may deteriorate, due to behavior of the pressure. Accordingly, an object is to provide an abnormality diagnosis device for an internal combustion engine, in which diagnosis accuracy can be improved.

The above object can be achieved by an abnormality diagnosis device for an internal combustion engine, the abnormality diagnosis device including a setting unit that is connected to an intake passage and that sets a reference value for pressure in the passage through which gas flows, an accumulating unit for accumulating a difference between the reference value and the pressure, from a point in time of the pressure falling below the reference value, to obtain a cumulative value, and a diagnosis unit for diagnosing an abnormality of the passage based on the cumulative value. When no peak is present in the pressure, the setting unit sets the reference value based on a state of the internal combustion engine, and when a peak is present in the pressure, the setting unit sets the peak as the reference value.

When no peak is present in the pressure at a first point in time, and also the pressure exhibits a peak at a second point in time later than the first point in time, the setting unit may set the reference value based on the state of the internal combustion engine at the first point in time and the accumulating unit may start accumulation from the first point in time, at the second point in time, the setting unit may set the peak as the reference value and the accumulating unit starts accumulation from the second point in time, and the diagnosis unit may diagnose an abnormality based on a cumulative value from the second point in time.

When a first peak and a second peak are present in the pressure, the setting unit may set a greater one of the first peak and the second peak to the reference value.

When no peak is present in the pressure, the setting unit may set the reference value based on an air amount of the internal combustion engine.

When the cumulative value is no smaller than a predetermined value, the diagnosis unit may diagnose that the passage is normal, and when the cumulative value is smaller than the predetermined value, the diagnosis unit may diagnose that the passage is abnormal.

An abnormality diagnosis device for an internal combustion engine, regarding which diagnosis accuracy can be improved, can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
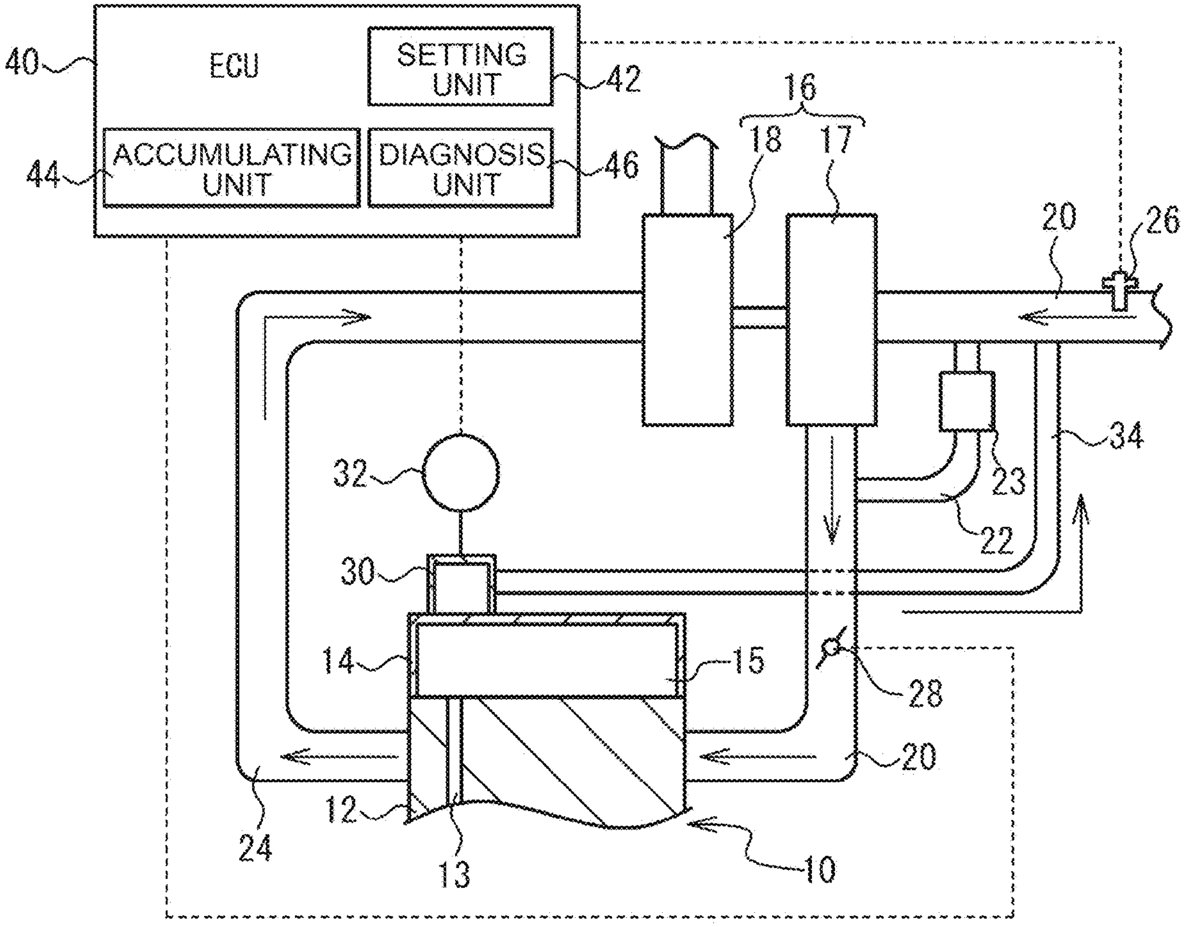
FIG. 1 is a schematic diagram illustrating an internal combustion engine and an abnormality diagnosis device.

Hereinafter, an abnormality diagnosis device for an internal combustion engine according to an embodiment of the present disclosure will be described with reference to the drawings. However, in the drawings, the dimensions, ratios, and the like of the respective parts may not be shown so as to completely coincide with the actual ones. Further, in some drawings, details are omitted.

FIG. 1 is a schematic diagram illustrating an internal combustion engine 10 and an abnormality diagnosis device. ECU (ElectronicControlUnit) 40 functions as an abnormality diagnosis device. The abnormality diagnosis device is applied to the internal combustion engine 10.

The internal combustion engine 10 is, for example, a gasoline engine, and burns fuel to generate a driving force. The internal combustion engine has a cylinder head 12 and a head cover 14, and also has a cylinder block and a crankcase (not shown). The cylinder head 12 is attached to a cylinder block. The head cover 14 covers the cylinder head 12. An intake passage 20 and an exhaust passage 24 are connected to the cylinder head 12.

A crankshaft is accommodated in the crankcase. The piston is connected to the crankshaft via a connecting rod. A combustion chamber is defined in the cylinder head 12. Air flowing through the intake passage is introduced into the combustion chamber. Fuel is injected from a fuel injection valve (not shown). When the air-fuel mixture is combusted in the combustion chamber, the piston reciprocates, and the crankshaft rotates. The exhaust gas generated in the combustion is discharged to the exhaust passage 24.

An air flow meter 26, a compressor 17, and a throttle valve 28 are arranged in this order from the upstream side in the intake passage 20. The air flow meter 26 detects a flow rate (air amount) of the air flowing through the intake passage 20. The throttle valve 28 regulates the amount of air. The larger the opening degree of the throttle valve 28 is, the more the amount of air increases. The smaller the opening degree, the smaller the air amount. A turbine 18 is provided in the exhaust passage 24.

The compressor 17 and the turbine 18 are connected to form a supercharger 16. The exhaust gas flowing through the exhaust passage 24 is blown to the turbine 18, and the turbine 18 rotates. The compressor 17 rotates with the turbine 18. The compressor 17 supercharges the air in the intake passage 20. By introducing high-pressure air into the internal combustion engine 10, the output of the internal combustion engine 10 is improved.

A bypass passage 22 is connected between the upstream side and the downstream side of the compressor 17 in the intake passage 20. A bypass valve 23 is provided in the middle of the bypass passage 22. By opening the bypass valve 23, air flows to the internal combustion engine 10 bypassing the compressor 17. When the bypass valve 23 is closed, more air flows to the compressor 17 and is supercharged.

The space 15 is defined by the head cover 14 and the cylinder head 12 of the internal combustion engine 10. The passage 13 is provided in the cylinder head 12 and the cylinder block, and extends from the space 15 to the inside of the crankcase. blowby gas leaking from the combustion chamber to the crankcase passes through the passage 13 and is accumulated in the space 15.

The coupling 30 is attached to the head cover 14. One end of the blowby gas passage 34 is connected to the coupling 30, and the other end is connected to a position upstream of the compressor 17 of the intake passage 20. The blowby gas in the space 15 flows through the blowby gas passage 34, returns to the intake passage 20, and is supplied to the internal combustion engine 10 together with the air. The pressure sensor 32 detects the pressure in the blowby gas passage 34.

When the throttle valve 28 is opened, air flows into the internal combustion engine 10. The pressure in the intake passage 20 decreases to a negative pressure lower than the atmospheric pressure. The blowby gas flows from the space 15 into the low-pressure intake passage 20. When the blowby gas flows, the pressure in the blowby gas passage 34 also becomes low, e.g., lower than atmospheric pressure. When an abnormality occurs in the blowby gas passage 34, the pressure in the blowby gas passage 34 is less likely to decrease. For example, if the blowby gas passage 34 is dislodged and if the blowby gas passage 34 is damaged, the blowby gas passage 34 is opened to the atmosphere. Therefore, the pressure is equivalent to the atmospheric pressure.

ECU40 is an abnormality diagnosis device, and includes an arithmetic device such as CPU (CentralProcessingUnit), RAM (RandomAccessMemory), and a storage device such as ROM (ReadOnlyMemory). ECU50 performs various types of control by executing programs stored in a ROM or a storage device. ECU40 acquires the pressure detected by the pressure sensor 32 and the air quantity detected by the air flow meter 26. ECU40 controls the opening degree of the bypass valve 23 and the opening degree of the throttle valve 28.

ECU40 functions as the setting unit 42, the accumulating unit 44, and the diagnosis unit 46. The setting unit 42 sets a reference value with respect to the pressure in the blowby gas passage 34. The accumulating unit 44 integrates the difference between the pressure and the reference value when the pressure is lower than the reference value. When the pressure is higher than the reference value, the accumulating unit 44 does not perform the integration. The diagnosis unit 46 diagnoses the blowby gas passage 34 on the basis of the cumulative value, and determines that it is normal or abnormal.

Figure 2:
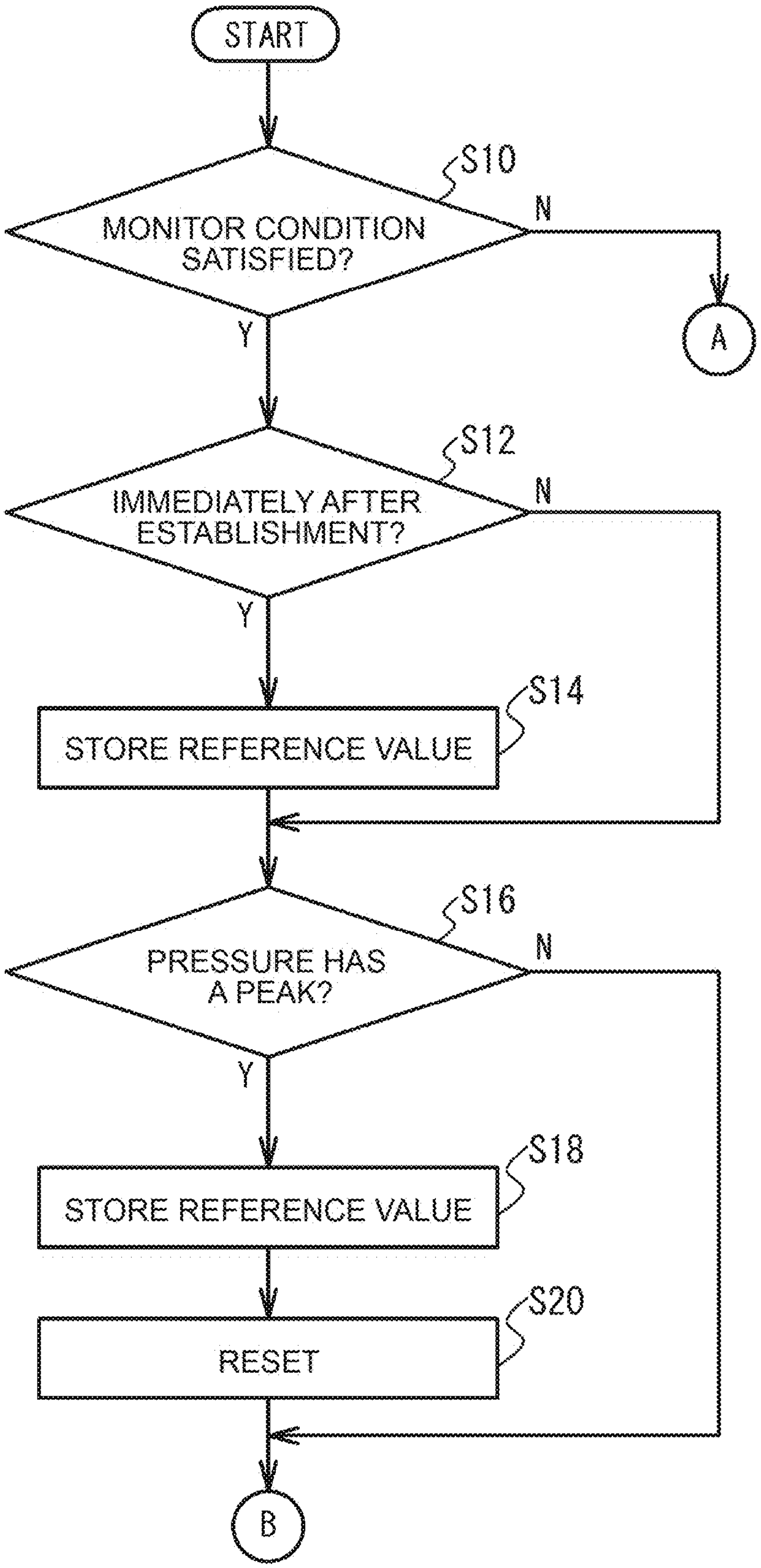
FIG. 2 is a flowchart illustrating a process according to the embodiment.
Figure 3:
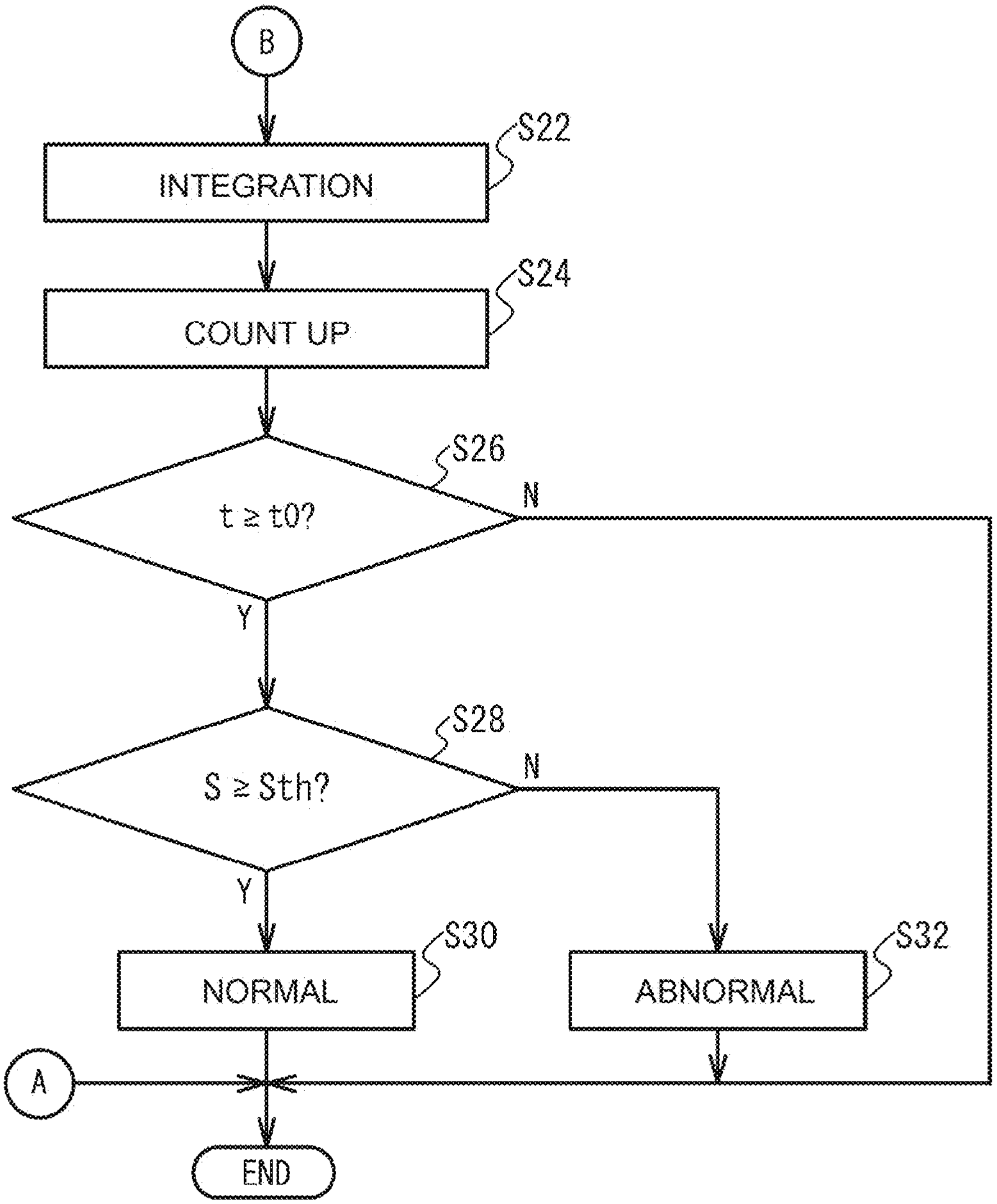
FIG. 3 is a flowchart illustrating a process according to the embodiment.

FIG. 2 and FIG. 3 are flowcharts illustrating processing according to the embodiment. ECU40 determines whether or not the pressure-monitoring condition is satisfied (S10). The monitoring condition is determined by the state of the internal combustion engine 10, and may be determined, for example, by the amount of air. When the air volume shifts from decreasing to increasing, the monitoring condition is satisfied. If the determination is negative (No), the process ends. If the determination is affirmative (Yes), ECU40 determines whether or not it is immediately after the monitoring condition is satisfied (S12). For example, if the elapsed time from the establishment of the monitoring condition is several milliseconds (several ms) or less, an affirmative determination is made. The setting unit 42 is configured to store, as a reference value, a pressure at the time when the monitoring condition is satisfied (S14).

After a negative determination or S14 in S12, the setting unit 42 determines whether or not there is a peak in the pressure (S16). At the peak, the time derivative of the pressure is from a positive value to 0 and from 0 to a negative value. The setting unit 42 monitors the pressure and detects a peak from a change in the differential value. If S16 is negative, a S22 is performed. If the determination is affirmative, the setting unit 42 stores the peak-time pressure as a new reference value (S18). The accumulating unit 44 resets the cumulative value performed until the new reference value is stored, and also resets the counting of the integrated time (S20).

As illustrated in FIG. 3, the accumulating unit 44 integrates the difference between the reference value of the pressure and the pressure detected by the pressure sensor 32, and calculates the cumulative value S (S22). The accumulating unit 44 also counts up the period of integration (S24). The accumulating unit 44 determines whether or not the integration time t has reached a predetermined time t0 or more (S26). If the determination is negative, the process ends. If the determination is affirmative, the diagnosis unit 46 determines whether or not the cumulative value S is equal to or greater than a predetermined value Sth (S28). When the cumulative value S is equal to or larger than Sth value (affirmative determination), the diagnosis unit 46 diagnoses that the blowby gas passage 34 is normal (S30). When the cumulative value S is less than Sth (negative determination), the diagnosis unit 46 diagnoses that the blowby gas passage 34 is abnormal (S32). Thus, the process ends.

FIGS. 4A to 5B are each a diagram illustrating a time chart according to an embodiment. In each figure, the upper row represents the pressure in the blowby gas passage 34. The lower row represents the amount of air flowing through the intake passage 20. In each figure, a hatched portion is an integrated range.

Figure 4A:
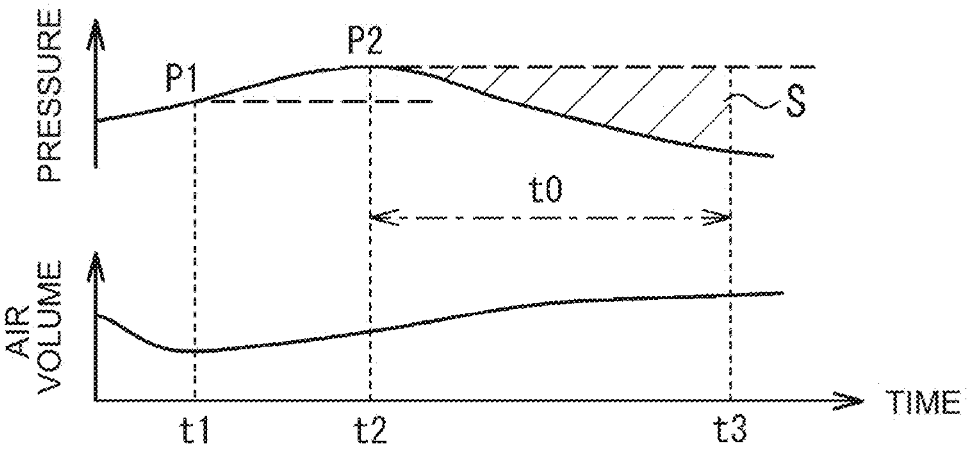
FIG. 4A is a diagram illustrating a time chart according to an embodiment.

FIG. 4A is an example in which the blowby gas passage 34 is normal. In the example of FIG. 4A, the air volume shifts from decreasing to increasing in the temporal t1 (S10 in FIG. 2). The setting unit 42 sets the pressure P1 in the time t1 as a reference value (S12). The setting unit 42 sets the peak P1 of the time t1 as a reference value, and the accumulating unit 44 starts the integration. It also rises after the time t1 and peaks in the time t2. The value of the peak P2 is greater than P1. The setting unit 42 sets the peak P2 as a reference value (S18). The pressure after the time t2 is lower than the reference value P2. The cumulative value using P1 as a reference value and the counting of the times are reset (S20). The accumulating unit 44 integrates the difference between the time period from the time t2 to t3, the reference value P2, and the pressure to calculate the cumulative value S (S22 in FIG. 3). The duration t0 from t2 to t3 is, for example, 400 ms.

Figure 4B:
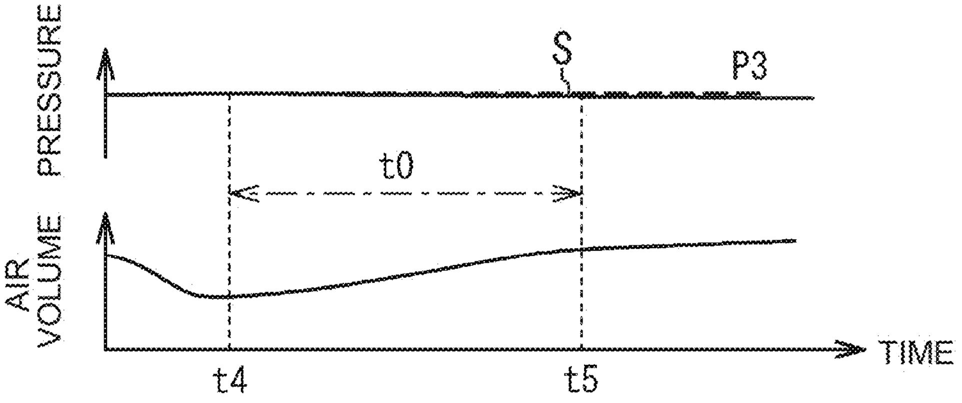
FIG. 4B is a diagram illustrating a time chart according to an embodiment.

FIG. 4B is an example in which the blowby gas passage 34 is abnormal. In FIG. 4B, the pressure is not peaked and remains near atmospheric pressure. Air volume begins to rise t4 hours. The setting unit 42 sets the pressure P3 in the time t4 as a reference value. After t4, the pressure is below the reference value P3. The accumulating unit 44 integrates the difference between the reference value P3 and the pressure from the time t4 to t5.

In FIG. 4A, the blowby gas passage 34 is pressurized as the air volume in the intake passage 20 is increased. The cumulative value S becomes larger, and becomes equal to or larger than the threshold Sth. The diagnosis unit 46 diagnoses as normal (step 30). In FIG. 4B, for example, the blowby gas passage 34 is removed. Regardless of the amount of air, the pressure in the blowby gas passage 34 is maintained at the same level as the atmospheric pressure. The cumulative value S is small and less than the threshold Sth. The diagnosis unit 46 diagnoses an anomaly (S32).

Figure 5A:
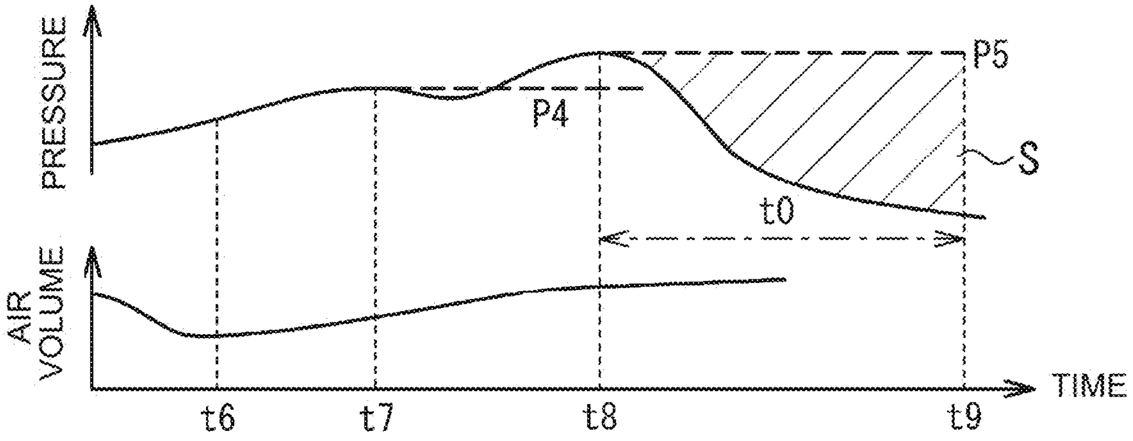
FIG. 5A is a diagram illustrating a time chart according to an embodiment.
Figure 5B:
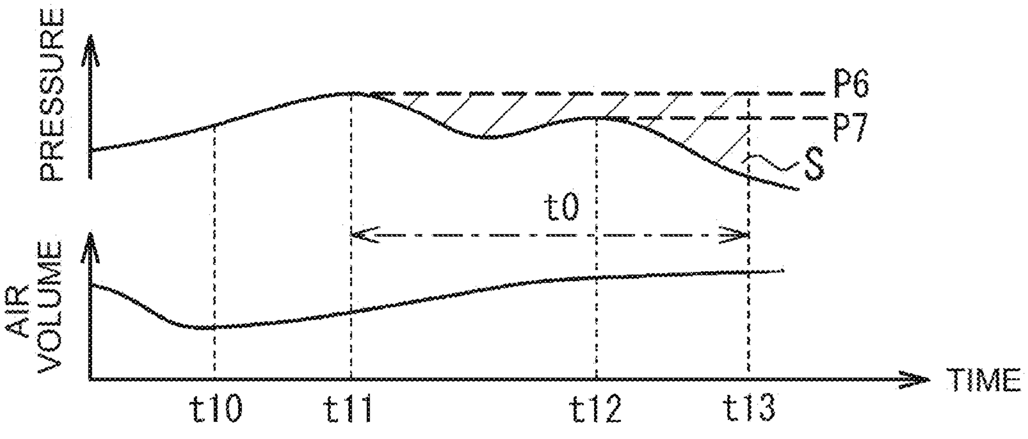
FIG. 5B is a diagram illustrating a time chart according to an embodiment.

In FIGS. 5A and 5B, the pressure-carrying element has two peaks. As shown in FIG. 5A, the airflow begins to grow t6 times. The pressure has a peak in the time t7 (first peak) and a peak in the time t8 (second peak). The setting unit 42 sets the peak P4 of the time t7 as a reference value, and the accumulating unit 44 starts the integration. The pressure P5 in the time t8 is higher than the pressure P4 in the time t7. The setting unit 42 sets the higher peak P5 of the two peaks as a reference value. The cumulative value using P4 as a reference value and the counting of the times are reset (S20). The accumulating unit 44 integrates P5 from the time t8 to 19 as a reference value. The cumulative value S having the pressure P5 as a reference value is larger than the cumulative value having the pressure P4 as a reference value. Diagnostic accuracy increases.

In the example in FIG. 5B, the airflow begins to grow t10 times. Peaks in t11 and t12 after temporal t10. The peak P6 in the time t11 is greater than P7 in the time t12. The accumulating unit 44 calculates the cumulative value S using P6 as a reference value without redoing the integration. The cumulative value increases, and the accuracy of diagnosis increases.

Figure 6A:
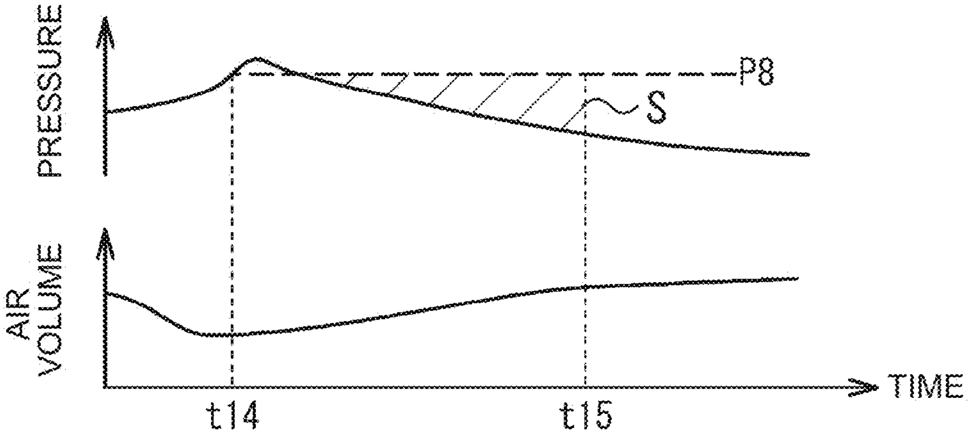
FIG. 6A is a diagram illustrating a time chart in the comparative example.
Figure 6B:
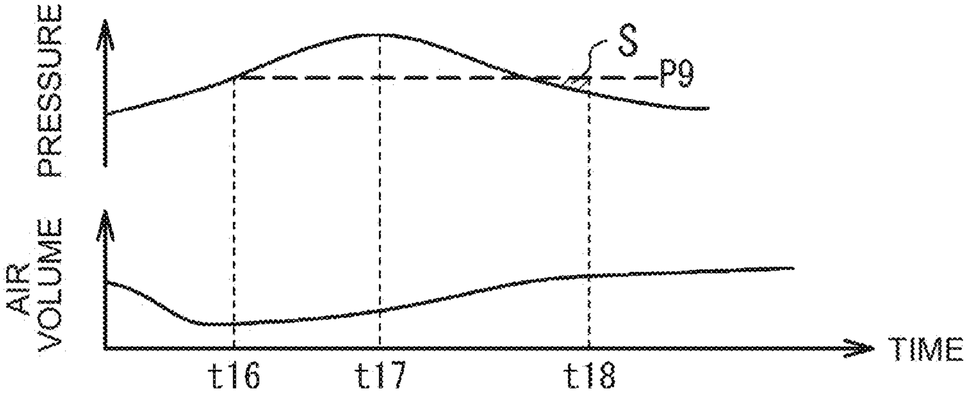
FIG. 6B is a diagram illustrating a time chart in the comparative example.

FIGS. 6A and 6B are each a diagram illustrating time charts in the comparative embodiment. In the example of FIG. 6A, the airflow begins to grow t14 times. The integration is performed from t14 to t15 using P8 of times t14 as a reference value.

In the example of FIG. 6B, the pressure P9 of the time t16 is used as a reference value. Air volume begins to rise t16 hours. However, the pressure peaks after t16 because the pressure response is delayed from the change in air volume. Since the pressure near the peak is larger than the reference value P9, the integration is not performed. Since the cumulative value S becomes small, the accuracy of the diagnosis of normal/abnormal is deteriorated.

According to the present embodiment, as shown in FIG. 4B, when there is no peak in the pressure, the setting unit 42 sets the pressure at the point in time when the air volume starts to increase as the reference value. As shown in FIG. 4A, when there is a peak in the pressure, the setting unit 42 sets the peak pressure as a reference value. The accumulating unit 44 integrates the difference between the reference value and the pressure. The diagnosis unit 46 performs diagnosis based on the cumulative value. When the cumulative value S is large as shown in FIG. 4A, the diagnosis unit 46 diagnoses as normal. When the cumulative value S is smaller as shown in FIG. 4B, the diagnosis unit 46 diagnoses an error. Since the reference value is determined in accordance with the behavior of the pressure, the accuracy of the diagnosis is improved.

As shown in FIG. 4A, the air-volume begins to rise t1 the first point in time-before the pressure-peak occurs. The setting unit 42 sets the pressure P1 at the time t1 as a reference value, and the accumulating unit 44 performs integration. Peaking occurs in the subsequent t2 (second point in time). The setting unit 42 sets the peak P2 as a reference value. The accumulating unit 44 performs integration from t2. The diagnosis unit 46 performs diagnosis based on the cumulative value S obtained by the integration from t2. Since the integration is performed from the time t1, it can be diagnosed even when there is no peak after the time t1. If a peak occurs after the temporal t1, the diagnosis is performed based on the cumulative value from the peak. It is possible to secure an opportunity for diagnosis and to improve accuracy.

As shown in FIGS. 5A and 5B, a plurality of peaks may occur in the pressure. The accumulating unit 44 performs integration from the first peak. Ensure opportunities for diagnosis. The setting unit 42 sets a large peak among the plurality of peaks as a reference value. As shown in FIG. 5A, when the peak P5 after the time is larger than the previous peak P4, the accumulating unit 44 performs the integration again using the large peak P5 as a reference value. The cumulative value S increases and the accuracy improves.

When the cumulative value S is equal to or larger than the threshold Sth, the diagnosis unit 46 determines that the cumulative value S is normal. When the cumulative value S is less than the threshold Sth, the diagnosis unit 46 determines that an error has occurred. The cumulative value S is determined according to whether the blowby gas passage 34 is normal or abnormal. It is possible to perform highly accurate diagnosis based on the cumulative value S.

In an abnormal condition, such as the blowby gas passage 34 being disengaged or the blowby gas passage 34 being perforated, the blowby gas passage 34 is opened to the atmosphere. For this reason, as shown in FIG. 4B, the pressure does not have a large peak, and it is difficult to reduce with increasing air volume, and the atmospheric pressure level is maintained. The setting unit 42 sets the pressure at the point in time when the air amount starts to increase as a reference value. The reference value is about the same as the atmospheric pressure, and the pressure does not significantly change from the reference value. The cumulative value S decreases. Abnormalities can be accurately detected.

The condition for monitoring the pressure is that the air volume shifts from decreasing to increasing (e.g., the time t1 of FIG. 4A). If there is no peak, the pressure at the point in time when the amount of air starts to increase becomes the reference value. The state of the internal combustion engine 10 may be set as a condition, and may be other than the air amount. For example, it may be a condition that the water temperature of the coolant of the internal combustion engine 10 is equal to or higher than a predetermined temperature, and that the pressure in the intake passage 20 is equal to or lower than a predetermined value. The duration t0 during which the integration is performed may be longer than 400 ms or shorter than 400 ms.

In the above example, ECU40 diagnoses the blowby gas passage 34. In addition to the blowby gas passage 34, embodiments may be applied to passageways that are connected to the intake passage 20 and through which gas passes, such as, for example, an EGR passageway.

Although the preferred embodiment of the disclosure is described above in detail, the disclosure is not limited to the specific embodiment, and various modifications and changes may be made within the scope of the disclosure described in claims.

What is claimed is:

1. An abnormality diagnosis device for an internal combustion engine, the abnormality diagnosis device comprising:

a setting unit that is connected to an intake passage and that sets a reference value for pressure in the passage through which gas flows;

an accumulating unit for accumulating a difference between the reference value and the pressure, from a point in time of the pressure falling below the reference value, to obtain a cumulative value; and a diagnosis unit for diagnosing an abnormality of the passage based on the cumulative value, wherein, when no peak is present in the pressure, the setting unit sets the reference value based on a state of the internal combustion engine, and when a peak is present in the pressure, the setting unit sets the peak as the reference value.

2. The abnormality diagnosis device according to claim 1, wherein, when no peak is present in the pressure at a first point in time, and also the pressure exhibits a peak at a second point in time later than the first point in time, the setting unit sets the reference value based on the state of the internal combustion engine at the first point in time and the accumulating unit starts accumulation from the first point in time, at the second point in time, the setting unit sets the peak as the reference value and the accumulating unit starts accumulation from the second point in time, and the diagnosis unit diagnoses an abnormality based on a cumulative value from the second point in time.

3. The abnormality diagnosis device according to claim 1, wherein, when a first peak and a second peak are present in the pressure, the setting unit sets a larger one of the first peak and the second peak to the reference value.

4. The abnormality diagnosis device according to claim 1, wherein, when no peak is present in the pressure, the setting unit sets the reference value based on an air amount of the internal combustion engine.

5. The abnormality diagnosis device according to claim 1, wherein, when the cumulative value is no smaller than a predetermined value, the diagnosis unit diagnoses that the passage is normal, and when the cumulative value is smaller than the predetermined value, the diagnosis unit diagnoses that the passage is abnormal.

* * * * *